United States Patent
Cadogan et al.

(10) Patent No.: US 9,844,918 B2
(45) Date of Patent: Dec. 19, 2017

(54) INFLATABLE PRESSURE INTENSIFIER

(71) Applicant: ILC DOVER LP, Frederica, DE (US)

(72) Inventors: David Phillip Cadogan, Middletown, DE (US); Stephen Emerson Scarborough, Frederica, DE (US); Anshu Dixit, Frederica, DE (US); Jonathan Michael Hinkle, Middletown, DE (US)

(73) Assignee: ILC DOVER, LP, Frederica (DE)

( * ) Notice: Subject to any disclaimer, the term of this patent is extended or adjusted under 35 U.S.C. 154(b) by 255 days.

(21) Appl. No.: 14/537,385

(22) Filed: Nov. 10, 2014

(65) Prior Publication Data
US 2016/0129646 A1  May 12, 2016

(51) Int. Cl.
| | | |
|---|---|---|
| *B29C 70/44* | (2006.01) | |
| *B29C 70/48* | (2006.01) | |
| *B29C 33/50* | (2006.01) | |
| *B29C 53/82* | (2006.01) | |
| *B29C 49/44* | (2006.01) | |
| *B29C 65/00* | (2006.01) | |
| *B29C 73/32* | (2006.01) | |
| *B29C 51/28* | (2006.01) | |
| *B29C 33/20* | (2006.01) | |

(52) U.S. Cl.
CPC .......... *B29C 70/446* (2013.01); *B29C 33/505* (2013.01); *B29C 53/824* (2013.01); *B29C 49/44* (2013.01); *B29C 51/28* (2013.01); *B29C 66/439* (2013.01); *B29C 66/494* (2013.01); *B29C 66/634* (2013.01); *B29C 70/443* (2013.01); *B29C 73/32* (2013.01); *B29C 2033/205* (2013.01)

(58) Field of Classification Search
CPC ..... B29C 70/44; B29C 70/443; B29C 70/446; B29C 53/824; B29C 33/505; B29C 2033/205; B29C 49/44; B29C 51/28; B29C 73/32; B29C 66/439; B29C 66/494; B29C 66/634; B29C 70/48
USPC ....... 425/389, 390, 393, 395, 501, 502, 503, 425/504, 518
See application file for complete search history.

(56) References Cited

U.S. PATENT DOCUMENTS

| | | | | |
|---|---|---|---|---|
| 2,446,620 A | * | 8/1948 | Swallow | ............. B29C 47/0016 251/5 |
| 3,290,728 A | * | 12/1966 | Pratt | ..................... B29C 33/505 249/178 |
| 3,879,160 A | * | 4/1975 | Miller | ..................... B29C 43/00 249/65 |
| 4,693,678 A | * | 9/1987 | Von Volkli | ............. B29C 70/342 264/510 |

(Continued)

FOREIGN PATENT DOCUMENTS

GB  2403927 A  *  1/2005  ........... B29C 70/086

OTHER PUBLICATIONS

International Search Report Dated May 6, 2015.

*Primary Examiner* — Seyed Masoud Malekzadeh
(74) *Attorney, Agent, or Firm* — Nixon Peabody LLP; Thomas P. Pavelko (57) ABSTRACT

This invention describes novel design and construction method for inflatable, pressure intensifier equipment that can be used for processing composites structures. The equipment can be used as a manufacturing and processing platform wherever low pressure and high temperature inputs are required in an enclosed volume.

19 Claims, 6 Drawing Sheets

(56) References Cited

U.S. PATENT DOCUMENTS

| | | | | |
|---|---|---|---|---|
| 4,780,262 A | * | 10/1988 | VonVolkli | B29C 70/342 264/101 |
| 4,822,272 A | * | 4/1989 | Yanase | B29C 33/04 156/173 |
| 5,266,249 A | * | 11/1993 | Grimes, III | B29C 70/44 114/357 |
| 5,338,177 A | * | 8/1994 | Le Touche | B29C 70/44 264/313 |
| 5,911,452 A | * | 6/1999 | Yan | A61F 2/958 29/282 |
| 6,171,423 B1 | * | 1/2001 | Murphy | B29C 49/24 156/172 |
| 6,190,598 B1 | * | 2/2001 | Murphy | B29C 70/342 264/314 |
| 6,485,668 B1 | * | 11/2002 | Murphy | B29C 49/24 156/156 |
| 6,551,091 B1 | * | 4/2003 | Bryant | B29C 43/3642 264/316 |
| 7,112,054 B2 | * | 9/2006 | Frantz | B29C 35/0233 156/156 |
| 7,824,171 B2 | * | 11/2010 | Hanson | B29C 33/505 264/257 |
| 8,187,517 B2 | * | 5/2012 | Westerdahl | B29C 33/76 264/313 |
| 8,215,360 B2 | * | 7/2012 | Pettersen | B29C 70/44 100/269.02 |
| 8,215,945 B2 | * | 7/2012 | Matsumoto | B29C 70/446 264/257 |
| 8,356,649 B2 | | 1/2013 | Cacace et al. | |
| 8,454,340 B1 | * | 6/2013 | Loveless | B29C 71/02 219/535 |
| 2003/0117003 A1 | * | 6/2003 | Fourrey | B29C 70/44 297/452.18 |
| 2003/0151171 A1 | * | 8/2003 | LeBreton | F16J 12/00 264/571 |
| 2004/0224139 A1 | * | 11/2004 | Backhouse | B29C 70/44 428/292.1 |
| 2007/0080481 A1 | * | 4/2007 | Kismarton | B29C 43/3642 264/236 |
| 2007/0096368 A1 | * | 5/2007 | Hanson | B29C 33/505 264/314 |
| 2008/0210372 A1 | | 9/2008 | Cumings et al. | |
| 2008/0241302 A1 | * | 10/2008 | Graham | B29C 33/04 425/172 |
| 2008/0308224 A1 | | 12/2008 | Barmichev et al. | |
| 2010/0243152 A1 | | 9/2010 | Helfrich et al. | |
| 2011/0011008 A1 | * | 1/2011 | Dagher | B29C 33/505 52/2.15 |
| 2012/0119412 A1 | * | 5/2012 | Havens | B29C 33/00 264/230 |
| 2012/0135099 A1 | * | 5/2012 | Dean | B29C 33/04 425/389 |
| 2012/0219660 A1 | * | 8/2012 | Sana | B29C 43/18 425/470 |
| 2012/0256348 A1 | * | 10/2012 | Bergmann | B29C 51/085 264/316 |
| 2013/0175731 A1 | * | 7/2013 | Doddman | B29C 70/446 264/250 |

\* cited by examiner

INFLATABLE PRESSURE INTENSIFIER

FIELD OF INVENTION

The present invention relates to manufacturing and processing apparatus that can used to produce, repair and co-cure composite parts of varying sizes and shapes. This apparatus is modular in design and can be made from a combination of rigid and non-rigid materials. It can be used for processing materials at low internal pressure and temperatures required to process composites. As part of the invention, an inflatable pressure intensifier can be used instead of an oven or an autoclave for processing Fiber-Reinforced Polymer (FRP) composite systems for such application in markets such as aerospace, automotive, commercial, or wind energy.

BACKGROUND OF THE INVENTION

Composites have been manufactured using several techniques and processes that can be categorized into open mold and closed mold categories. Autoclaves are traditionally used to manufacture both large and small, high quality composite parts with complex shapes that require simultaneous input of isotactic high pressure and high temperature. However, autoclave equipment is capital intensive to purchase and the operational facility costs associated with autoclave processing are very high. Autoclaves also limit the size or shape of the parts being manufactured because of practical limitations of these pressure vessels, and therefore cause manufacturers to make components with joints to form larger systems (aircraft wings, rocket casings, etc.) that add mass and reduce reliability. In some industries, such as in the manufacture of wind turbine blades & towers where mass inefficiencies can be tolerated, simple vacuum bag processing of large parts is conducted. This creates parts that are heavy and often have less than desirable part quality. There has recently been a sustained effort to develop manufacturing methods that do not require an Autoclave and can produce composites parts of high quality. The development in composite prepregs that can be processed at lower temperatures and pressures can accelerate the growth of composite products and usage in different markets. There are other manufacturing methods such as resin transfer molding (RTM) and Vacuum assisted resin transfer molding, compression molding, etc. . . . that are increasingly being used to produce composite parts. However, no one has yet developed a technology that will enable the processing of large parts with uniform external pressure application above one atmosphere (vacuum bagging), outside of a rigid autoclave.

SUMMARY OF THE INVENTION

This invention comprises a pressure intensifier in the form of an inflatable chamber that serves as the apparatus to manufacture and process composite materials. This inflatable chamber can also act as the apparatus that can be used to cure composites by applying pressure and temperature. The wall of the inflatable chamber is made from an assembly of multiple layers of flexible materials. In one embodiment of the invention this assembly of multiple layers of flexible materials are joined or seamed in a manner that allows for the chamber to take a shape of a horizontal cylinder with hemi-spherical ends when the chamber is inflated with air pressure. The chamber resembles and functions as a pressure vessel when it is inflated with air pressure.

The fundamental design of the pressure intensifier of the invention permits it to be made available to the composites manufacturer in any size ranging from a small table top module to a large structure spanning hundreds of feet in length and tens of feet in diameter. The pressure intensifier can be a simple shape such as a straight cylinder, or it can be manufactured with angles or include protrusions to accommodate unusually shaped parts. The pressure intensifier can be a freestanding single volume or it can be attached to a rigid base or tool at its perimeter. Attaching to the perimeter of a tool is important for industries such as wind turbine component manufacture where large tools are already in existence and the addition of the pressure intensifier will greatly improve part consolidation beyond current vacuum bagging approaches.

The flexible wall of the chamber is made from an integrated assembly of various layers of softgoods materials. The wall of the inflatable chamber is comprised of multiple flexible layers that are attached together to form a single assembly. The outermost layer of the assembly is called the restraint and is made from high strength webbings that are woven and or connected to one another to form a structural shell or net that can withstand the stresses induced by pressurization loads. High strength fabrics, braided tubes, or cord nets can also be used to form the structural restraint. Numerous types of fibers can be used in the restraint assembly including, but not limited to, Kevlar, Vectran, Nylon, polyester, and stainless steel. The next layer (sometimes the middle layer) of the flexible wall of the chamber is made from flexible materials with good thermal insulation properties such as fabrics, foams, or batting. This layer enables the interior of the chamber to be maintained at an elevated temperature, as required to produce and process the contents inside the chamber, while protecting the structural layer from exposure to elevated temperatures that could degrade its structural performance. A third layer of the flexible wall, which is also the innermost layer of the assembly and referred to as the bladder, is made from a film or coated fabric that is thermally welded or bonded together. This innermost layer contains the pressurization medium that applies the consolidation pressure for composite parts being processed inside the chamber, and is manufactured from materials that can withstand the temperatures associated with processing polymeric composites of all types. The bladder (or other layers) of the flexible wall can be fitted with integrated sensors of an externally applied type or an integral electronic textile type for process monitoring and control, or for structural health monitoring of the pressure intensifier itself. Although we have described three layers of the flexible wall, additional layers can be added as required to improve functionality or safety. For example, a structural fabric layer is sometimes added between the webbing restraint and the insulation to provide structural redundancy.

The flexible wall of the chamber is designed such that it can incorporate a pressure sealing zipper and means for opening and closing the structural layer such that parts can be inserted and removed from the pressure intensifier assembly. One way to accomplish this is to locate the closure system where one of the hemispherical ends is attached to the main body of the cylinder. This will enable parts to be transferred in and out through the endcap similar to a standard autoclave. The closure mechanism can also be applied to the sidewall of the pressure intensifier such that parts can be loaded and unloaded through the side of the vessel, or so that the vessel can be deployed over the part(s) being consolidated in the vessel. This approach also facilitates the removal of the vessel over the part to facilitate the use of overhead crane systems to access the parts before and after cure.

The flexible wall of the inflatable chamber can be fitted with any number of sealed pass-through systems to facilitate pressurization, thermal regulation, sensor use, visual assessment, or other needs for part consolidation in the vessel. One way to do this is through the addition of rigid metal panels attached to the vessel such that all the layers function in an uninterrupted manner, and support the addition of ports.

For larger sizes, or higher pressure applications of the pressure intensifier, an interconnected frame work of metal beams is provided. A skeletal framework of metal beams is also useful in sharing the forces exerted on the wall of the pressure vessel and therefore permits the vessel to grow in size and shape beyond the practical limits of an unsupported inflatable structure. The softgoods wall of the intensifier protrudes between the support beams such that it looks like a quilted mattress. This design reduces the skin stress of the lobed sections by reducing their local radius of curvature, which is the variable, along with internal pressure, that dictates skin stress. Lower skin stresses are desirable because they increase safety for the user, and allow the chamber to be used at higher pressures. The flexible material assembly of the chamber wall has a provision to be attached to the external metal frame such that it does not collapse onto the base when the chamber is not inflated, thus facilitating the simple loading and unloading of the vessel. The metal support beams can be made to be easily removable for access to the parts (end or side) with closures in the vessel as described previously. The metal framework can be configured such that any part shape can be made including straight high aspect ratio parts, long angled parts, parts with protruding features, etc. The framework can even be built in "L", "Y", "T"-shapes or other three-dimensional shapes, if desired. This approach can be extremely low cost in application because the metal frame and bag can be made inexpensively, transported, and thereafter assembled easily in comparison to a large autoclave.

The pressure intensifier can also be configured to include the rigid metal frame on the inside. If the rigid frame is in the inside of the chamber, it acts like a skeleton to support the weight of the flexible material assembly of the chamber wall when the chamber is not inflated. When the chamber is inflated, the wall is self-supporting as a result of the pressurization. The inflatable chamber module preferable has a spherical or cylindrical cross-sectional profile when it's inflated.

The inflatable chamber can be fixed in one location or attached to a base that is movable. Many configurations are possible to create a pressure intensifier system that is usable with existing equipment or can be an entirely new asset in a manufacturing facility.

The interior of the chamber typically contains a rigid metal platform that is connected to the rigid base via the legs on the rigid frame. This rigid platform is for the purpose of holding the part(s) being processed inside the pressure intensifier. The rigid platform can be heated directly by using heater elements attached to the platform, or can be heated by heating of the air in the chamber, use of heat lamps, or heat blankets.

DETAILED DESCRIPTION OF THE PREFERRED EMBODIMENTS

Figure 1:
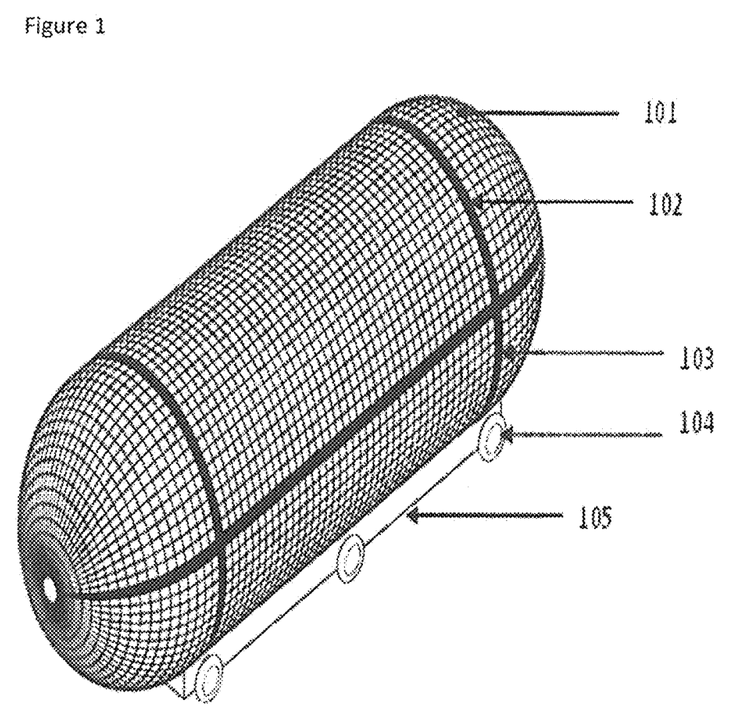
FIG. 1: Illustrates the view from outside of flexible and inflatable pressure intensifier equipment.

FIG. 1 illustrates a perspective view of a single module of the inflatable pressure intensifier when it is in its fully pressurized state. The inflatable chamber wall made from the softgoods 101 as shown in the FIG. 1 has pressure sealable opening 102 integrated into it to allow access inside the chamber to place the payload inside the intensifier. Another pressure sealable opening 103 provides a way to attach one of hemi-spherical ends of the inflatable chamber to the main cylindrical body. The inflatable chamber is connected to a rigid base 105 at the bottom. The rigid base 105 allows for the pressure intensifier to be stable in its pressurized state and wheels 104 can be added to the base 105 to make it possible to move the equipment with ease.

Figure 2:
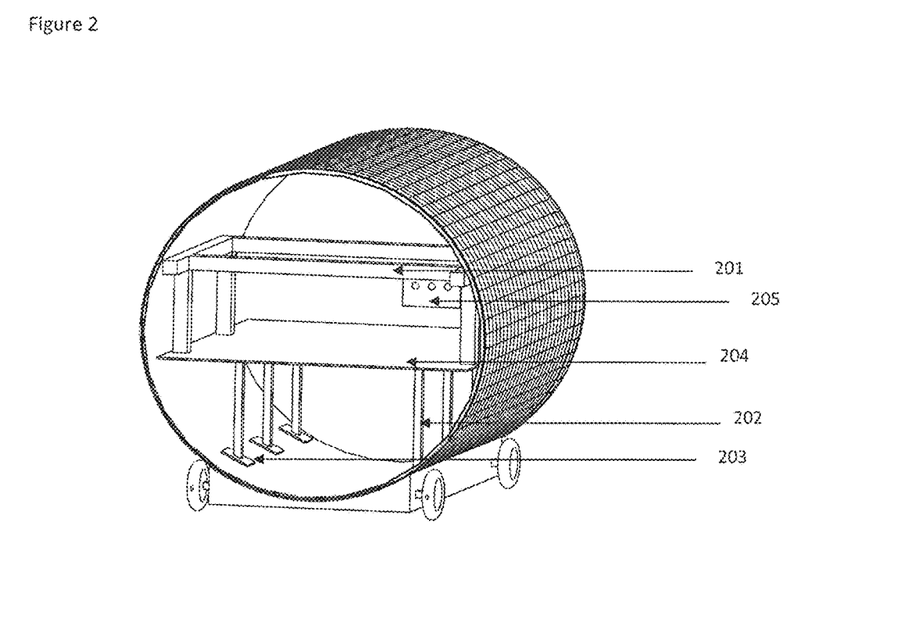
FIG. 2: Illustrates the inside view of pressure intensifier equipment.

FIG. 2 illustrates a cross-sectional view of the single module of the inflatable pressure intensifier when it is fully pressurized. A rigid metal frame is inscribed in the inflatable shell, with the flat platform 204 in the center and the rigid structural support 201 for the softgoods 205. The platform 204 and the structural support 201 are connected to the base 105. The hemispherical end of the inflatable shell has rigid panel integrated into the softgoods 205. This panel is configured to attach the required interfaces to provide the input, such as circulated hot air and pressure and process monitoring and control equipment.

Figure 3:
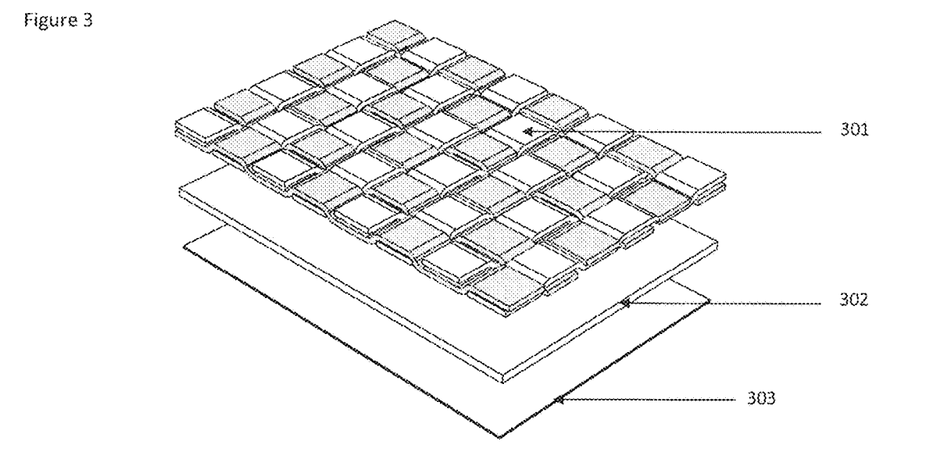
FIG. 3: Cross-sectional view of the flexible layers that form the inflatable shell of the pressure intensifier.

FIG. 3 shows the cross-sectional assembly of different layers of softgoods materials that comprise the inflatable shell of the pressure intensifier equipment. The outermost layer 301 represents the member that is load bearing as it carries the skin stress developed due to inflation pressure. This layer is constructed from high strength webbings made out of high strength textiles, such as Kevlar®, Vectran®, polyester or Nylon. This restraint layer is configured of high strength webbings, ropes, or by braiding into a pattern that maximizes its strength, durability, and safety. The middle layer 302 of the assembly is made from materials that can offer thermal insulation, and the function of the middle layer 302 is to maintain the internal temperature of the pressure intensifier within a desired range while minimizing power inputs. This middle layer 302 can be made from numerous kinds of flexible materials including aerogels, fiberglass, lofted polyester, foams, and other fiber based insulation materials. The innermost layer 303 of the assembly is referred to as the "bladder" and has a main function of retaining the air pressure without leaking. The bladder is made from coated fabrics or membranes which are sealed or bonded together, and are able to function through a wide range of temperatures encountered in polymeric composites processing.

Figure 4A:
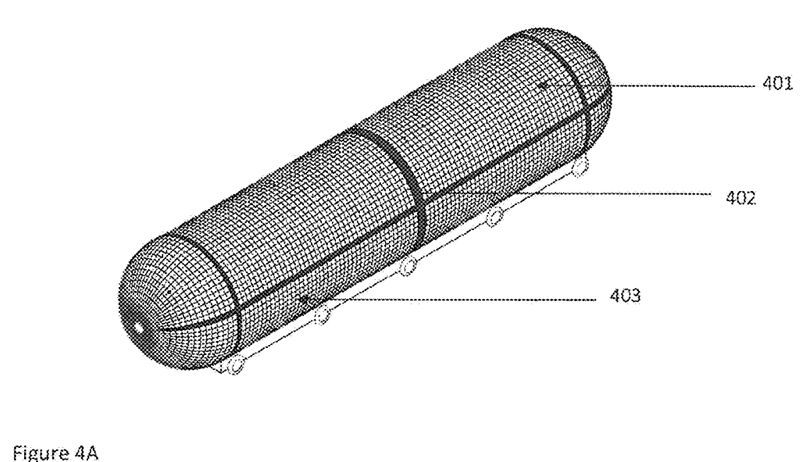
FIG. 4A: Illustrates a mechanism wherein two modules of the pressure intensifier equipment can be linearly attached.

FIG. 4A shows an embodiment of the pressure Intensifier in which two modules 401 and 403 are joined together via a mechanism 402. The mechanism 402 that attaches two or more modules together can be a pressure sealing zipper and/or employ a method of connecting the structural restraint such as buckles or carabineers. This feature enables the processing of parts that have a high aspect ratio which can then be accommodated in a single module of the pressure intensifier.

Figure 4B:
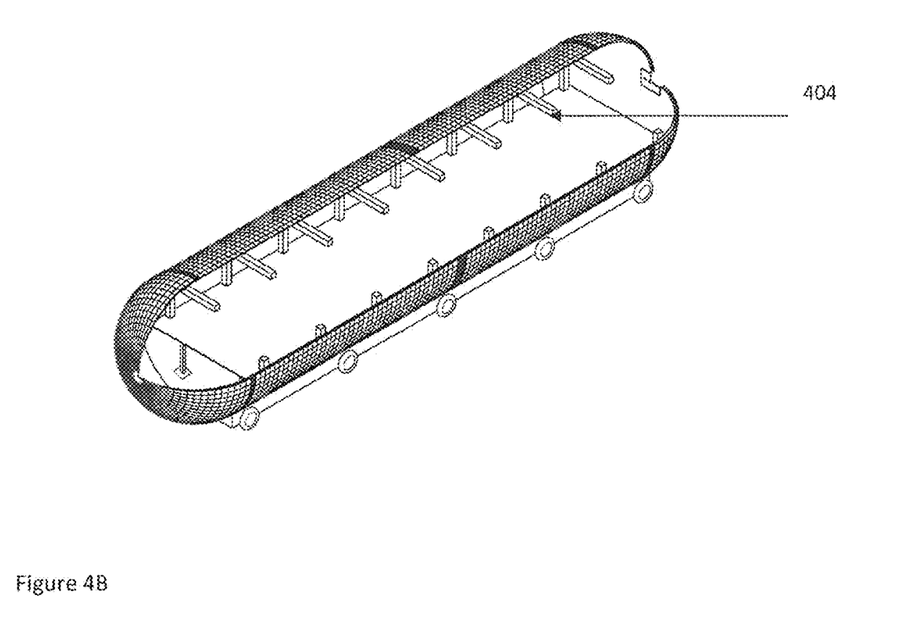
FIG. 4B: Illustrates a partially cut away view of FIG. 4A.

FIG. 4B shows a cut-away view of the two modules attached together such that the rigid frames of the two modules are placed in tandem to form a pressure intensifier module that has an increased internal volume to support processing of larger payloads.

Figure 5A:
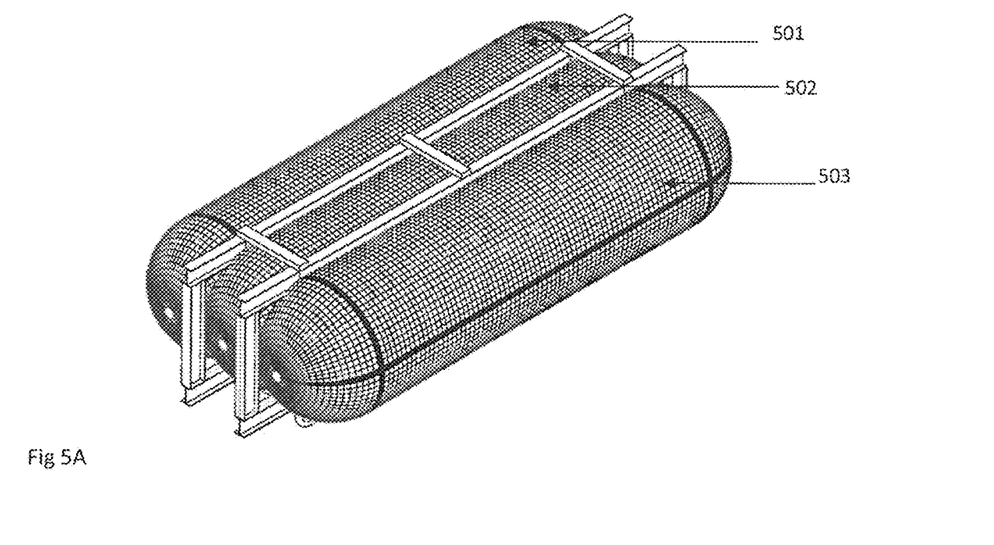
FIG. 5A: Illustrates multiple modules of the pressure intensifier equipment attached laterally (with external rigid frame)
Figure 5B:
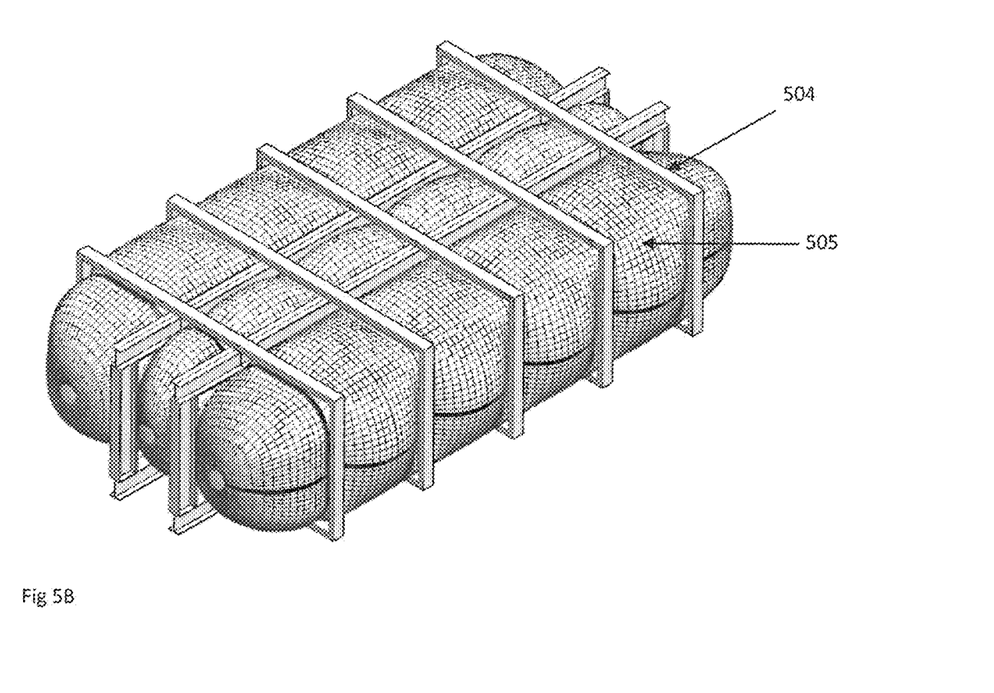
FIG. 5B: Illustrates multiple modules of the pressure intensifier with attached lateral and longitudinal rigid external framework; and, FIG. 6; Illustrates the pressure intensifier design with rigid metal restraint.

FIG. 5A shows an embodiment in which three modules of the pressure intensifier equipment are attached laterally to provide an increased volume that will accommodate large and asymmetrically shaped payloads for processing in the chamber, with FIG. 5B illustrating an alternative embodiment in which three modules of the pressure intensifier are attached both laterally and longitudinally to provide an increased volume that will accommodate large and asymmetrically shaped payloads for processing in the chamber.

Figure 6:
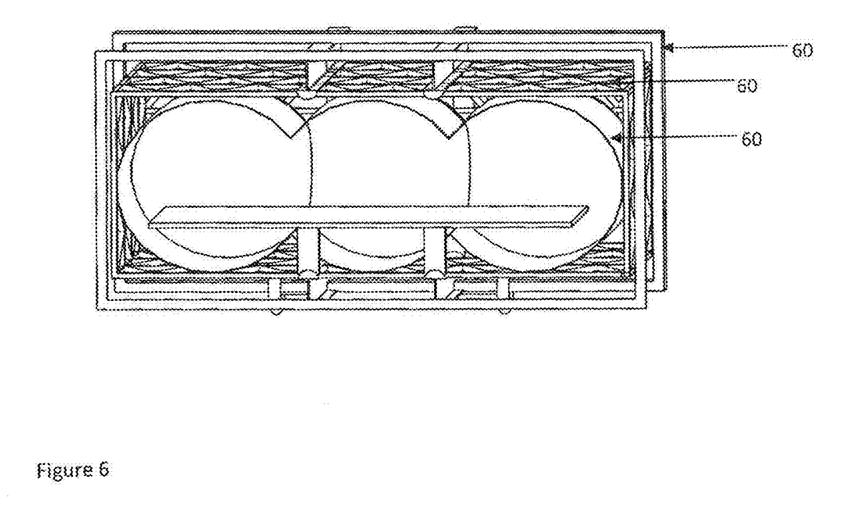

FIG. 6 shows an embodiment of the pressure intensifier where a metal frame with several rigid elements is used in conjunction with softgoods to form the pressure intensifier equipment that can be scaled to any size or shape, and allows the chamber to be used at higher pressures with greater safety.

We claim:

1. A flexible walled pressure intensifier for processing composite materials, the processing consisting of at least one selected from the group consisting of curing, post-curing, co-curing, bonding composite parts and combinations thereof;
    wherein the pressure intensifier comprises a plurality of inflatable shell modules, the shell modules being connectable; the modules, when connected together form a single vessel with an internal volume, such that the pressure intensifier can be configured in any size or shape to accommodate different sizes and shapes of the composite materials to be processed within the internal volume formed by the pressure intensifier;
    each of the plurality of inflatable shell modules of the pressure intensifier further comprising an inflatable shell made from a plurality of layers of softgoods
    the pressure intensifier further comprising a removable interconnected framework of rigid beams that support and constrain the softgoods of the inflatable shell; and
    a rigid internal platform, positioned inside of the internal volume, configured to support the composite materials to be processed.

2. The pressure intensifier of claim 1, wherein the inflatable shell modules of the pressure intensifier provide the internal volume inside the pressure intensifier to which inputs of pressure and temperature are connected.

3. The pressure intensifier of claim 1, wherein the softgoods is at least one selected from the group consisting of textile webbings, woven fabrics, nonwoven fabrics, ropes, coated fabrics, polymeric films and flexible insulation materials.

4. The pressure intensifier of claim 1, further comprising a rigid base with wheels to make the pressure intensifier mobile.

5. The pressure intensifier of claim 1, further comprising different sections of softgoods; and further comprising mechanical interfaces for the different sections of softgoods; whereby the mechanical interfaces connect the different sections of the softgoods to create a door of any size and shape.

6. The pressure intensifier of claim 5, wherein the mechanical interfaces are selected from the group consisting of pressure sealing zippers, clips, buckles and carabineers.

7. The pressure intensifier of claim 5, wherein the inflatable shell modules of the pressure intensifier provides the internal volume inside the pressure intensifier and the mechanical interfaces allow access into the internal volume when the interfaces are not connecting the different sections of the softgoods.

8. The pressure intensifier of claim 1, further comprising rigid panels on the softgoods to provide at least one of ports and pass-through connectors; wherein the pass-through connectors permit supply of at least one of inputs selected from the group consisting of heat, vacuum, air and sensors for process monitoring and control.

9. The pressure intensifier of claim 3, wherein the layer of each of the plurality of layers of the inflatable shell has a thickness, and the plurality of layers are attached at various points through the thickness of the layers to form a flexible laminate.

10. The pressure intensifier of claim 3, wherein the plurality of layers of the inflatable shell modules perform the functions of structural loading, air retention and thermal insulation.

11. The pressure intensifier of claim 3, wherein an innermost layer of the shell modules is a bladder layer which comprises a coated textile material, wherein the coating is capable of withstanding temperatures associated with processing polymeric composite materials.

12. The pressure intensifier of claim 1, wherein the inflatable shell is configured from the group consisting of joined multiple modules in a linear configuration, in a lateral configuration and both in a lateral and longitudinal configuration.

13. The pressure intensifier of claim 1, wherein the rigid support framework inscribes or circumscribes the softgoods to support the softgoods when the inflatable shell is not inflated.

14. The pressure intensifier of claim 3, further comprising sensors embedded in the softgoods layers of the inflatable shell modules to provide at least one of the functions selected from the group consisting of process monitoring, control of process inside the inflatable shell and structural health monitoring of the inflatable shell itself.

15. The pressure intensifier of claim 3, wherein the textile webbings are joined periodically by at least one selected from the group consisting of woven together and joined periodically and overlapped and joined periodically.

16. The pressure intensifier of claim 1, wherein the inflatable shell modules of the pressure intensifier can be partially disassembled to ease loading and unloading of parts into the pressure intensifier.

17. The pressure intensifier of claim 1, in a shape selected from the group consisting of a straight cylinder and a cylinder with angles or protrusions to accommodate asymmetrically shaped parts.

18. The pressure intensifier of claim 1, in a shape of a horizontal cylinder with hemispherical ends.

19. The pressure intensifier of claim 1, having a length of hundreds of feet.

* * * * *